US007539311B2

(12) United States Patent
Weis

(10) Patent No.: US 7,539,311 B2
(45) Date of Patent: May 26, 2009

(54) TECHNIQUES FOR MANAGING KEYS USING A KEY SERVER IN A NETWORK SEGMENT

(75) Inventor: Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 384 days.

(21) Appl. No.: 11/379,000

(22) Filed: Mar. 17, 2006

(65) Prior Publication Data

US 2007/0217611 A1 Sep. 20, 2007

(51) Int. Cl.
*H04L 9/00* (2006.01)
(52) U.S. Cl. .................. 380/277; 705/71; 713/171; 726/1; 726/2; 726/22
(58) Field of Classification Search .................. None
See application file for complete search history.

(56) References Cited

U.S. PATENT DOCUMENTS

| 6,804,703 | B1* | 10/2004 | Allen et al. | 709/216 |
| 2005/0050004 | A1* | 3/2005 | Sheu et al. | 707/1 |
| 2006/0088167 | A1* | 4/2006 | Bade et al. | 380/281 |
| 2006/0129691 | A1* | 6/2006 | Coffee et al. | 709/230 |

OTHER PUBLICATIONS

U.S. Appl. No. 10/625,445, Huang.
U.S. Appl. No. 11/183,278, Weis.
E. Barker, et al.,, "Recommendation for Key Management—Part 1:General", NIST Special Publication 800-57 Part 1, Aug. 2005.
E. Barker, et al., "Recommendation for Key Management—Part 2:Best Practices for Key Management Organization", NIST Special Publication 800-57 Part 2, Aug. 2005.
J.R. Douceur, 2002. The Sybil Attack. In Revised Papers From the First international Workshop on Peer-To-Peer Systems (Mar. 7-8, 2002). P. Druschel, M. F. Kaashoek, and A. I. Rowstron, Eds. Lecture Notes In Computer Science, vol. 2429. Springer-Verlag, London, 251-260. Available at http://www.cs.rice.edu/Conferences/IPTPS02/101.pdf.
M. Dworkin, "Recommendation for Block Cipher Modes of Operation: The CMAC Mode for Authentication", NIST Special Publication 800-38B, May 2005; http://csrc.nist.gov/publications/nistpubs/800-38C/SP800-38C.pdf.
IEEE, "IEEE P802.1AE/D4.0 Draft Standard for Local and Metropolitan Area Networks: Media Access Control (MAC) Security", Aug. 25, 2005.

(Continued)

*Primary Examiner*—Kambiz Zand
*Assistant Examiner*—Roderick Tolentino
(74) *Attorney, Agent, or Firm*—Brian N. Young; Trellis IP Law Group, PC

(57) ABSTRACT

The election of a key server is provided. The key server is a single device that broadcasts an encryption key to other devices in a network segment. Also, automatic reelection of a new key server is provided when a current key server becomes unavailable. Key receivers may separately detect that a new key server is needed and separately determine from state information which key receiver should be elected the new key server. The state information may have been received in previously sent messages. Thus, further messaging is not needed to elect a new key server.

41 Claims, 7 Drawing Sheets

OTHER PUBLICATIONS

D. A. McGrew, J. Viega, "The Galois/Counter Mode of Operation (GCM)", May 31, 2005, Available at http://csrc.nist.gov/CryptoToolkit/modes/proposedmodes/gcm/gcm-revised-spec.pdf.

NIST, "Advanced Encryption Standards", FIPS 197, Nov. 2001. Available at http://csrc.nist.gov/publications/fips/index.html.

NIST, "Annex C: Approved Random Number Generators for FIPS PUB 140-2, Security Requirements for Cryptographic Modules", Draft, Jan. 31, 2005.

NIST, "Security requirements for Cryptograpic Modules", FIPS 140-2, May 2001. Available at http://csrc.nist.gov/publications/fips/index.html.

NIST, Draft NIST AES Key Wrap Specification, Nov. 16, 2001. Available at http://csrc.nist.gov/CryptoToolkit/kms/key-wrap.pdf.

NIST Computer Security Division's CSRC Home page, See http://csrc.nist.gov/.

A. Perrig, et. al., "Efficient Authentication and Signing of Multicast Streams over Lossy Channels", IEEE Symposium on Security and Privacy (May 2000), pp. 56-73.

Perrig, A., et. al., SPINS: Security Protocols for Sensor Networks, Wireless Networks (Sep. 2002), vol. 8, No. 5, pp. 521-534. Available at http://sparrow.ece.cmu.edu/~adrian/projects/mc2001/spins-wine-journal.pdf.

M. Seaman, "A distributed fault-tolerant group key selection protocol for MACsec", Revision 0.4, Dec. 2004; http://www.ieee802.org/1/files/public/docs2004/af-KeySelectionProtocol-seaman-v03.pdf.

Mick Seaman, "A distributed fault-tolerant group key selection protocol for MACsec", Rev.0.3, Jul. 6, 2004, 8 pages.

\* cited by examiner

TECHNIQUES FOR MANAGING KEYS USING A KEY SERVER IN A NETWORK SEGMENT

BACKGROUND OF THE INVENTION

Embodiments of the present invention generally relate to computer networks and more specifically to techniques for managing a secure key using a key server in a network segment.

Devices in a local area network (LAN) require an encryption method for the data link layer (layer 2). A secure key is needed to protect data communications among devices connected to the LAN. The secure key is used by all devices in the LAN when sending data amongst each other.

A data link layer encryption method (commonly called LinkSec or MACsec) has been defined for IEEE 802 LANs. For devices on the LAN to use the same group key, they must obtain the same generated group key. Traditionally, the generated key is distributed manually to each device. An administrator thus manually installs the key. One proposal is for a group key to be generated in which all devices contribute information that is used in the generation of the group key use to communicate. For example, all devices broadcast information to every other device in the LAN. When one device receives all the information from the other devices, the information is combined together to create a group key based on heuristics. Each device in a LAN uses the same heuristics to generate the group key. In this method, a lot of messages are transmitted among the devices. This requires a lot of regulations to ensure the messaging is performed correctly.

DETAILED DESCRIPTION OF EMBODIMENTS OF THE INVENTION

Figure 1:
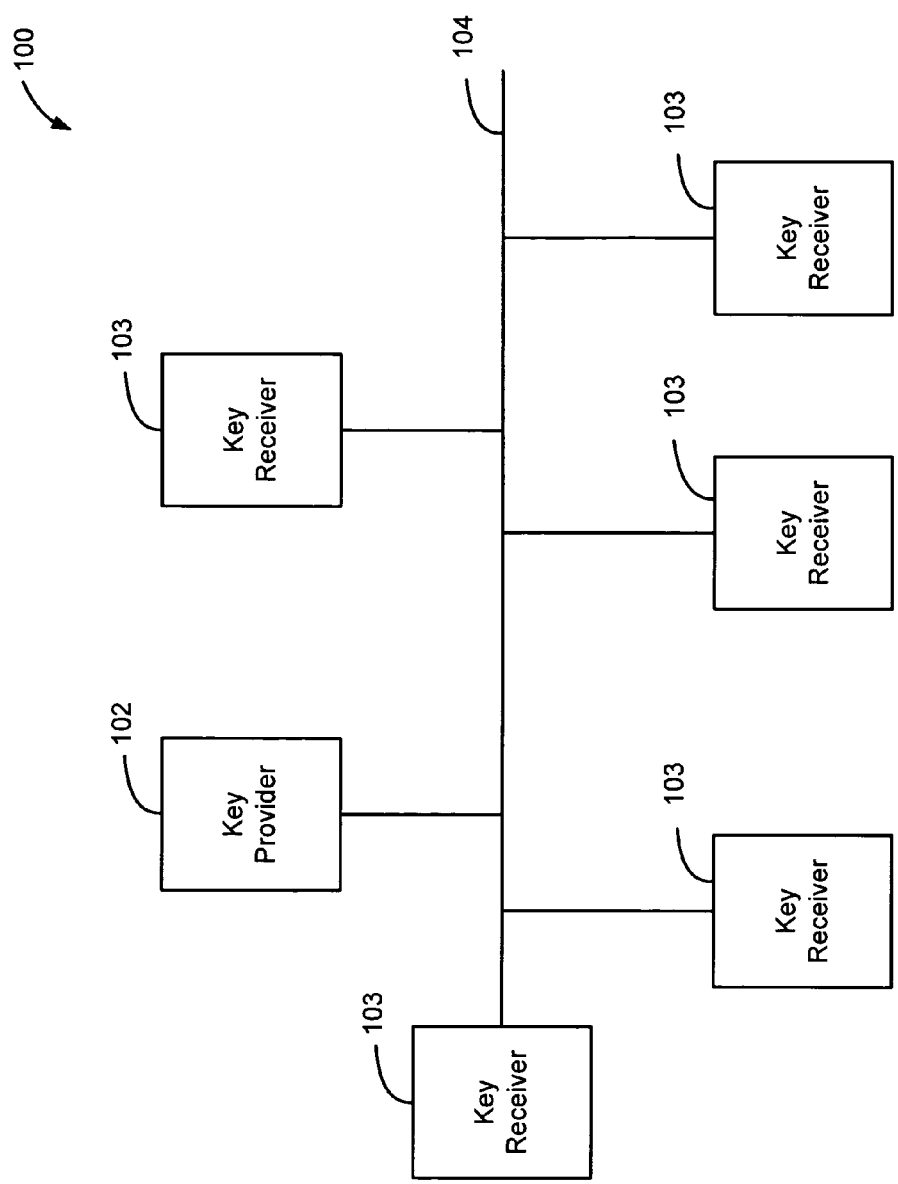
FIG. 1 depicts a system according to one embodiment of the present invention.

FIG. 1 depicts a system 100 according to one embodiment of the present invention. As shown, the devices (labeled as key server 102 and key receivers 103) may be coupled together via a network segment 104.

Network segment 104 may be any segment of a network. For example, network segment 104 is at least a part of a local area network (LAN). Although a LAN will be described, it will be understood that other networks may use methods described in embodiments of the present invention.

In one embodiment, network segment 104 may include devices in the configuration shown in FIG. 1. The devices may include a router connected to an Ethernet cable. Other devices may be computers connected to the Ethernet cable. Although this network segment 104 is shown, a person skilled in the art will appreciate other network configurations that can be used, which will be described in more detail below. Also, embodiments of the present invention are not restricted to LANs. For example, techniques described may be used with a metropolitan area network (MAN) or devices separated by a wide area network (WAN) when those devices communicate through a network tunnel link.

Although more than two devices are shown, network segment 104 may include a point-to-point link between two devices or may be a multi-access segment for multiple devices (three or more). Embodiments of the present invention can be used for both cases.

When devices become online (e.g., are powered up), the devices secure a long-term connectivity association key (CAK). This is a long-term key associated with a connectivity association (CA). The CA provides the CAK, which is a long-term security key that is used to authenticate that the device is authorized to be connected to network segment 104.

Once a CAK is secured, an initialization process is entered to obtain a secure association key (SAK). The SAK is used to encrypt data communications (packets) sent among devices through network segment 104. In one embodiment, the SAK is used at the data link layer (e.g., layer 2) and allows all authorized devices (devices with a valid CAK) to communicate through data links on network segment 104.

Embodiments of the present invention elect a single key server 102 from any live devices on network segment 104. Key server 102 distributes the SAK to other available key receivers 103 on network segment 104. Key server 102 is a single device that generates the SAK and distributes it to key receivers 103 in network segment 104. Key receivers 103 are devices that receive the SAK from key server 102.

The SAK is transported in messages that are encrypted to prevent their disclosure to devices that are not authorized to have the SAK. In one embodiment, the CAK is used to protect the SAK. For example, an AES Key Wrap algorithm is used. A key wrap encrypting key (KEK) is derived from the CAK and used to encrypt the SAK. Only key receivers 103 possessing the CAK can decrypt the messages including the SAK. Once the SAK is obtained, key server 102 and key receivers 103 use the SAK to encrypt messages sent on network segment 104.

All devices may be configured with two states, a key server state and a key receiver state. Depending on which state is active, different actions may be performed. For example, in the key server state, key server 102 sends out a SAK to other key receivers 103. Also, when a request is received for a SAK, key server 102 sends a SAK to the requestor.

In the key receiver state, key receiver 103 expects to receive a SAK from key server 102. Also, key receivers 103 ignore any requests for SAKs. Further, key receivers 103 are configured to elect a new key server 102 when it is determined that a new key server 102 is needed.

Devices can transition from one state to another state. For example, when a key receiver 103 determines that it should be key server 102, it transitions its state automatically.

A protocol may be used to provide processes described. For example, the protocol provides for the election of key server 102 that is a single device that broadcasts the SAK to other devices in network segment 104. Also, automatic reelection of a new key server 102 is provided when a current key server 102 becomes unavailable. Reelection is important because packets may be lost if this does not happen. The SAK may be refreshed periodically. If packets are sent with a stale SAK, they may be rejected. Thus, if a key server 102 becomes unavailable, a new SAK will not be sent.

The automatic reelection may be performed using state information that is stored on each key receiver 103. In one embodiment, each key receiver 103 may detect separately that a new key server 102 is needed and separately determine from state information which key receiver 103 should be elected the new key server 102. The state information may have been received in previously sent messages. Thus, further messaging is not needed to elect a new key server 102. Accordingly, the election may be processed quickly and automatically.

Initialization Process

New devices may initialize on network segment 104 at any time. In this case, the new devices should receive the current SAK to allow them to send encrypted messages across network segment 104. The following process can be used whether the device is the first device to initialize, is the second device (a point to point link), or is after the second device (a multi-access network link).

Figure 2:
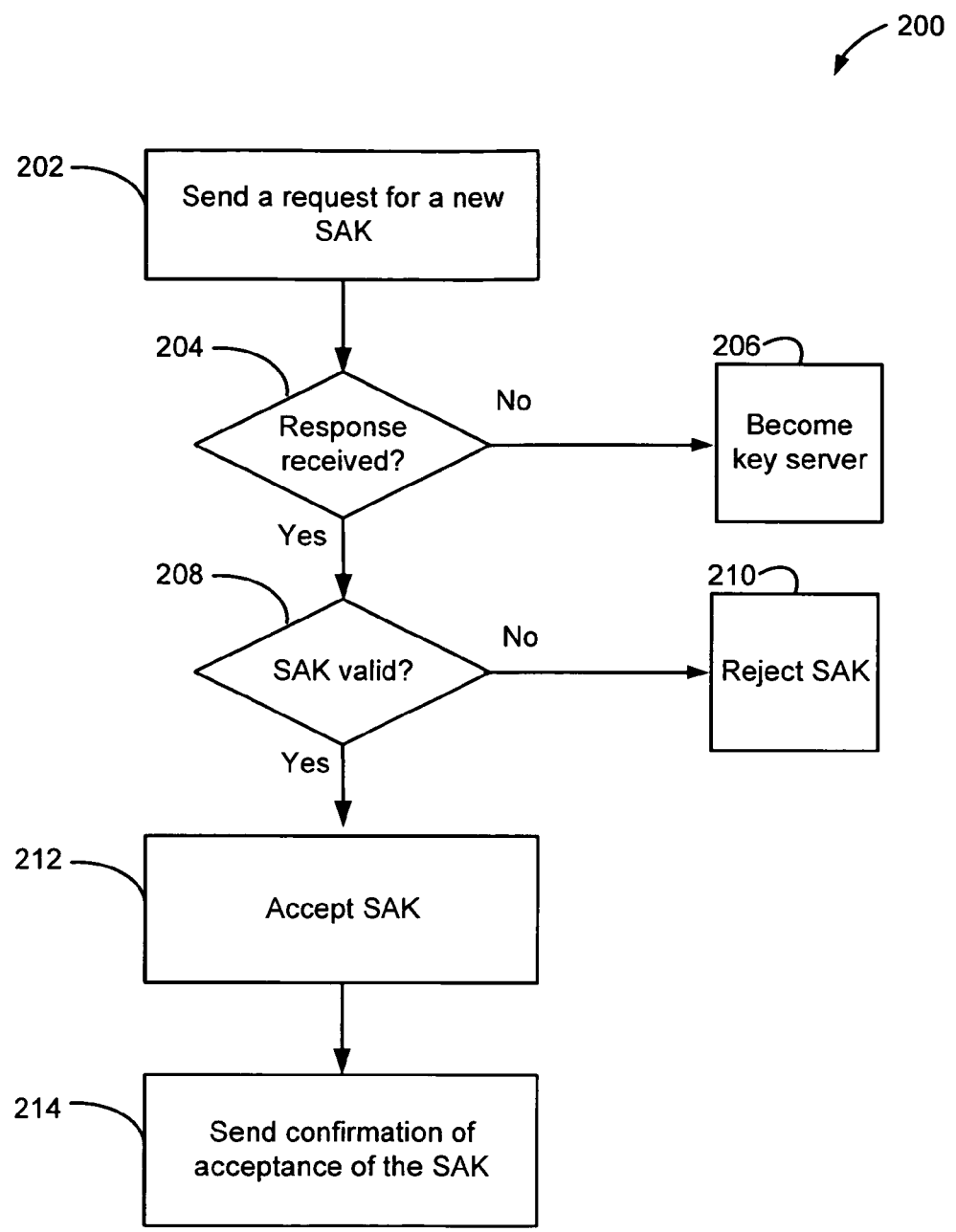
FIG. 2 shows a simplified flow chart of a method for initializing a new device according to one embodiment of the present invention.

FIG. 2 shows a simplified flow chart 200 of a method for initializing a new device according to one embodiment of the present invention. Step 202 sends a request for a SAK when a new device is initialized in network segment 104. The request may be broadcasted to all devices in network segment 104.

Step 204 determines if a response is received for the request. If no response is received, then the new device becomes key server 102 in step 206. A response may not be received because the device is the first device to be initialized in network segment 104. Although it is described that only one request is sent, the device may send multiple requests and may become key server 102 after a certain number of requests are sent without receiving a response. The device becomes key server 102 because, if a key server 102 already existed on a network segment 104, it would send the current SAK to the requesting device when it receives the request.

If a response with a message including a current SAK is received from key server 102, step 208 determines if the SAK is valid. For example, the new device may determine if key server 102 is authorized to send messages on network segment 104. This authorization may validate the connectivity association key that was used to send the message containing the SAK.

If the message containing the SAK is not valid, step 210 rejects the SAK. Also, key receiver 103 may send a message requesting that a new key server 102 be elected. A new key server 102 may be elected.

If the message containing the SAK is valid, step 212 accepts the SAK. The SAK may be stored and later used in sending messages to key server 102 and other key receivers 103 in network segment 104.

Step 214 sends a message to key server 102 indicating the SAK has been accepted.

Determination of Unavailable Key Server and Election of New Key Server Process

Once key server 102 has been elected, techniques are provided to ensure that key server 102 is available (or online). As described above, having key server 102 available may be important because a SAK may need to be refreshed after a pre-determined time period. Thus, if key server 102 is not available, then a new SAK will not be generated at the correct time.

Figure 3:
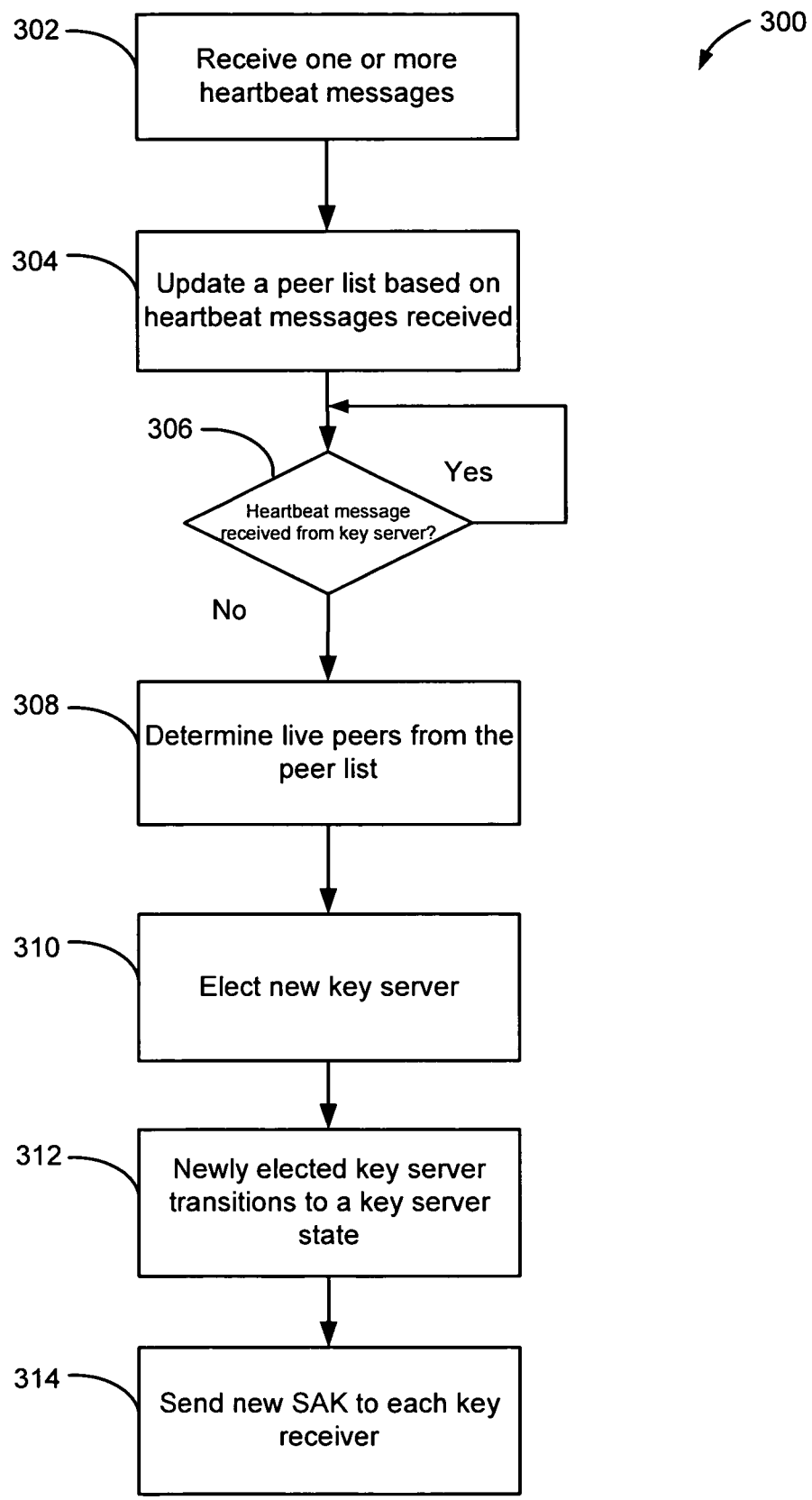
FIG. 3 depicts a simplified flow chart of a method for electing a new key server when a current key server becomes unavailable according to one embodiment of the present invention.

FIG. 3 depicts a simplified flow chart 300 of a method for electing a new key server 102 when a current key server 102 becomes unavailable according to one embodiment of the present invention. Step 302 receives one or more heartbeat messages from devices (key server 102 and/or key receivers 103) on network segment 104. A heartbeat message may be any message. For example, after a period of time without sending any messages, a key server 102 or key receiver 103 may send a heartbeat message. The heartbeat message indicates that the device is still alive. A heartbeat message may also be considered any message sent by a device in normal communications using the protocol. For example, if a message is sent during the time a heartbeat message should be sent, the device may not send a heartbeat message because other devices can assume that the device is live because the message has been sent.

Step 304 then updates a peer list based on the heartbeat messages received. The peer list may maintain a liveness state for all peers (key receivers 103 and key server 102) on segment 104. The peer list indicates whether or not a peer is available (i.e., recently sent a message). Peers may be classified as live or potential. Live peers are peers that have been sent a SAK and have sent a message confirming receipt of the SAK. A potential peer is a peer that has requested a SAK but has not yet received it or sent a message confirming receipt. A peer that was live but has become unavailable (i.e., has not sent a heartbeat message during a time period) may be removed from the peer list or may be listed as having an unavailable state. Other information may also be stored in the peer list, such as the device identifiers. This may be used to send messages to other device or in determining a new key server 102.

State information is also maintained for other peers on network segment 104. This information is sent in the heartbeat messages or in any other message sent. For example, the state stored may include information for a CAK, the device's identity, the identity of a current key server 102, a SAK, identities of live devices on network segment 104, identities of potential devices on network segment 104, etc.

Embodiments of the present invention use the state information to elect a new key server 102. This will be described in more detail below.

Step 306 determines if a heartbeat message has not been received from key server 102 during a pre-determined period of time. Key server 102 is configured to send a heartbeat message after a certain interval of time passes without sending a message (or just at a certain interval of time). If the heartbeat message is received, the process reiterates to continue monitoring for heartbeat messages If the time period elapses and a heartbeat message has not been received, key receiver 103 may determine that key server 102 is unavailable. In this case, step 308 determines live peers (e.g., key receivers 103 considered to have a live state) from its peer list in network segment 104. Live peers are determined because a new key server 102 should be elected among only live peers in network segment 104. This makes sure that any other peers that may have been online in network segment 104 but may now be offline are not elected as key server 102.

Step 310 then elects a new key server 102. For example, each key receiver 103 may determine who the new key server 102 should be using heuristics. Key receivers 103 may maintain the same state information and can automatically determine a new key server 102 using the state information. In one embodiment, this determination can be done separately without communication among live key receivers 103. For example, key receivers 103 may review stored state information for other key receivers 103 and its own information, and determine which key receiver 103 should become key server 102. In one example, the highest member identifier, highest media access control (MAC) address, or any other identification qualities may be used to determine a new key server 102 based on the stored state.

In some cases, a tie may occur in which case two devices may think they are key server 102. A tie-breaker heuristic may be used to break the tie. For example, a device with the highest identifier, secure channel identifier, IP address, etc. may be chosen.

In step 312, the newly-elected key server 102 transitions its state to a key server state from the key receiver state. The other key receivers 103 remain in the key receiver state.

In step 314, the newly-elected key server 102 the broadcasts a new SAK to each key receiver 103. Key server 102 chooses SAKs randomly. For example, the SAK is generated using a strong random number generator (RNG), such as one approved by the Federal Information Processing Standard (FIPS) Publication 140-2. However, the SAK may be generated using other known methods and a person skilled in the art will appreciate how to generate a SAK.

Although it is described that a new key server 102 is elected when a heartbeat message is not received, a new key server 102 may be elected in other situations. For example, key receiver 103 may request that a new key server 102 be elected, an indication that a new key server 102 is needed is received, etc.

EXAMPLE

Figure 4A:
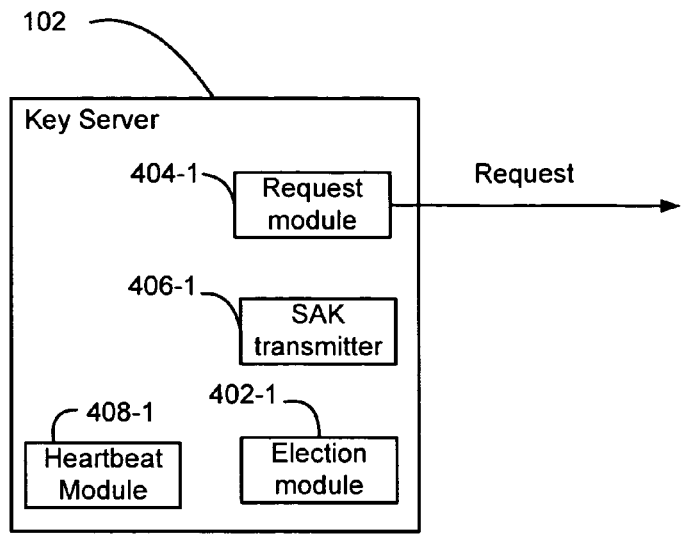
FIGS. 4A-4E depict block diagrams of a possible process according to one embodiment of the present invention.

FIGS. 4A-4F depict block diagrams of a possible process according to one embodiment of the present invention. FIG. 4A shows a device that is the first to initialize on network segment 104. A request module 404-1 sends a request for a SAK when it initializes. In this example, a response is not received. An election module 402-1 is configured to elect a key server 102 from any available devices. In this example, no other devices are available and thus the device becomes key server 102.

Figure 4B:
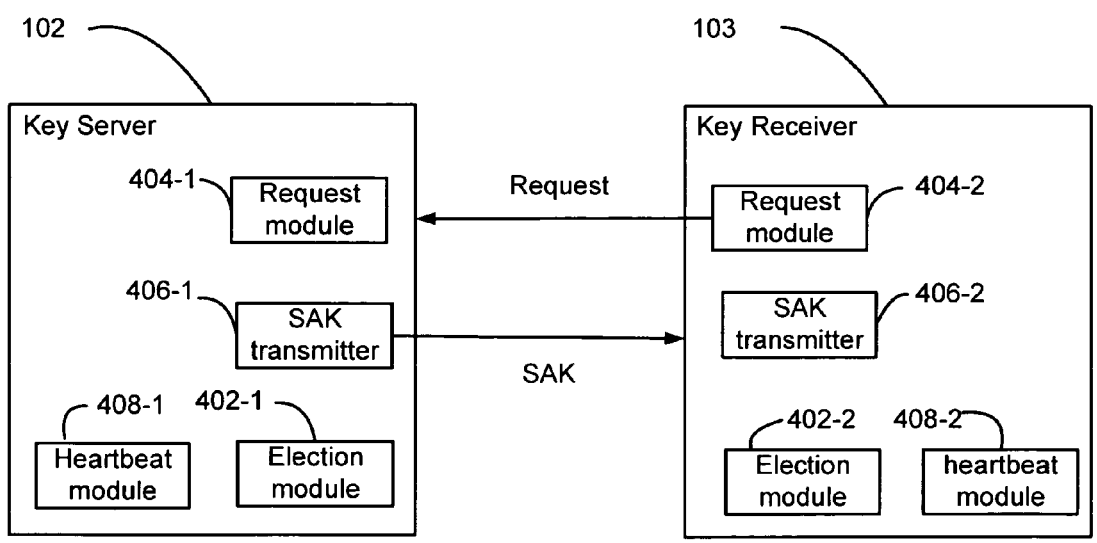

FIG. 4B shows a first key receiver 103 that comes online to network segment 104. A request module 404-2 is configured to send a request for a SAK. Key server 102 receives the request and a SAK transmitter 406-1 is configured to send a packet with the SAK to key receiver 103.

First key receiver 103 receives the packet and determines if the SAK is valid or not. If valid, the SAK is stored.

Figure 4C:
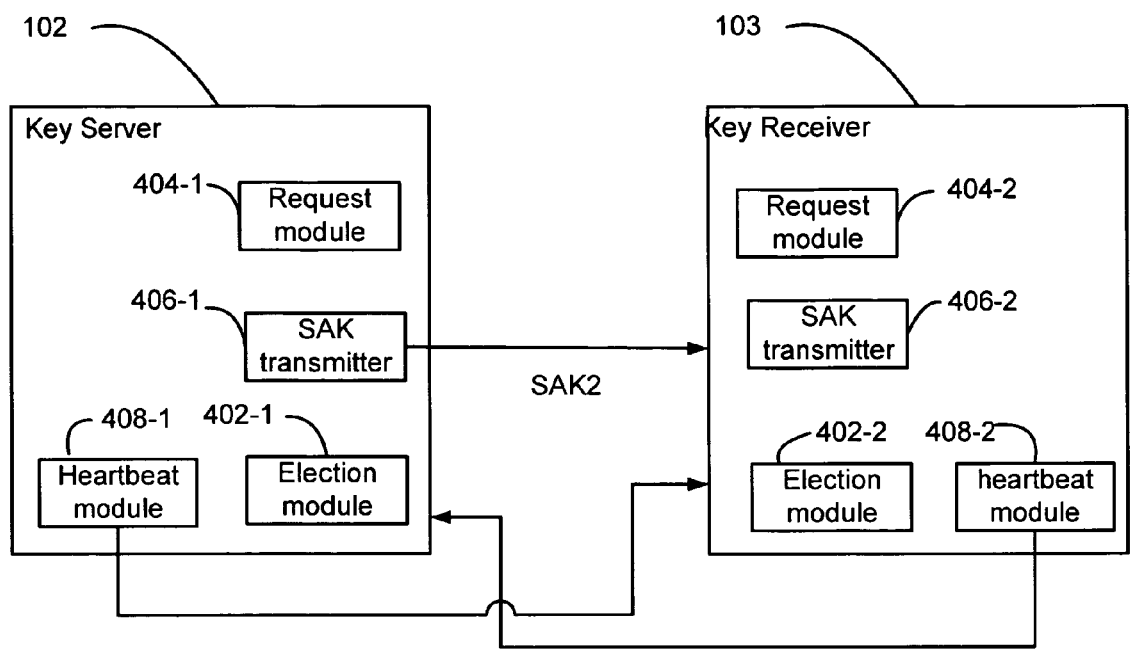

In FIG. 4C, a heartbeat module 408 in both key receiver 103 and key server 102 sends heartbeat messages. Also, SAK transmitter 406-1 may send a new SAK, "SAK2", to key receiver 103 after a pre-determined period of time. The new SAK2 is now used in data communications.

Figure 4D:
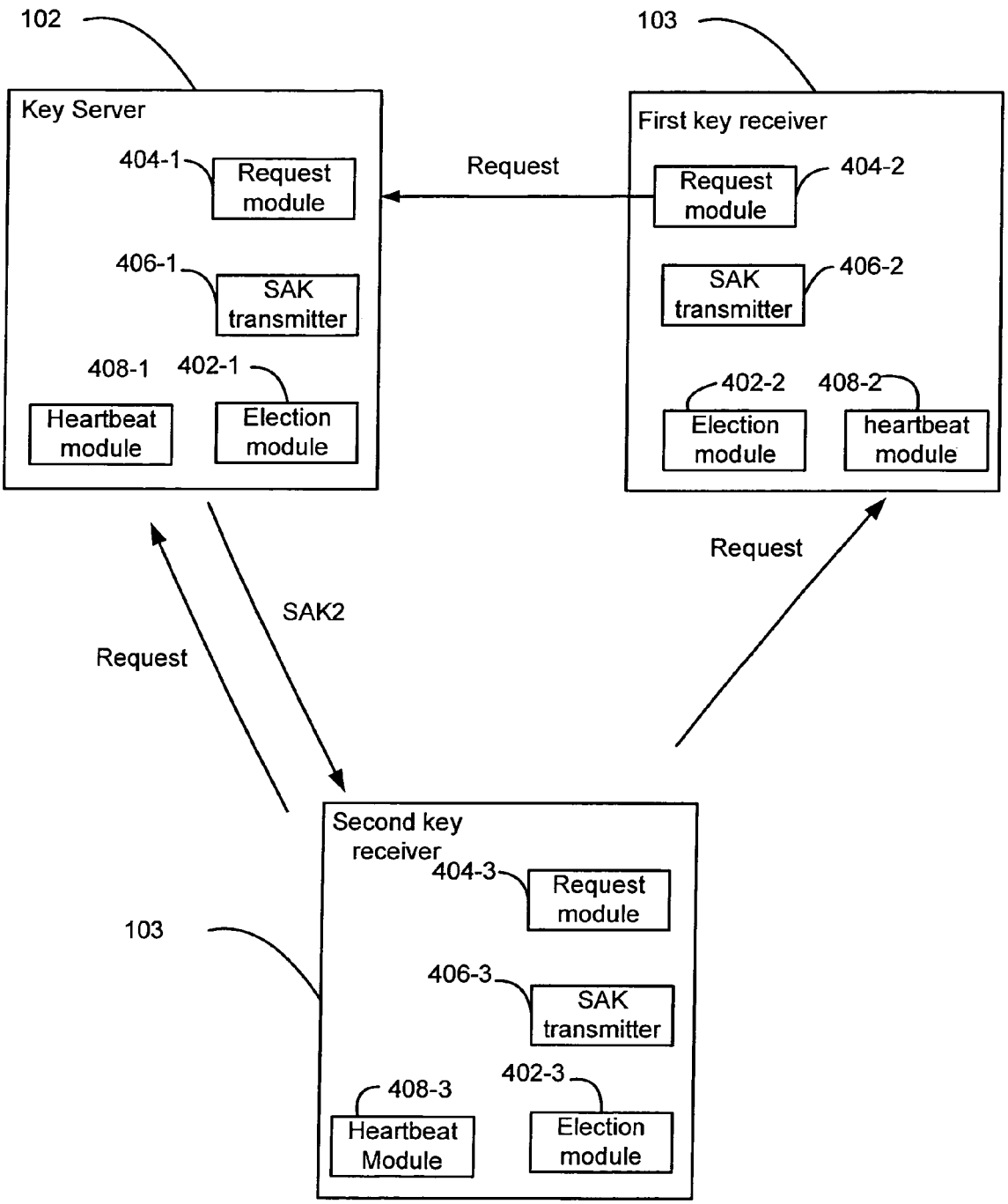

FIG. 4D shows when a second key receiver 103 comes online. A request module 404-3 is used to send a request for a SAK. First key receiver 103 may receive the request but is configured not to respond to the request. This adheres to having only one key server 102 in network segment 104.

Key server 102 receives the request and SAK transmitter 406-1 sends SAK2 to second key receiver 103. SAK2 is validated and stored by second key receiver 103. Heartbeat modules 410 are then configured to send heartbeats messages among key server 102, first key receiver 103 and second key receiver 103-2.

Figure 4E:
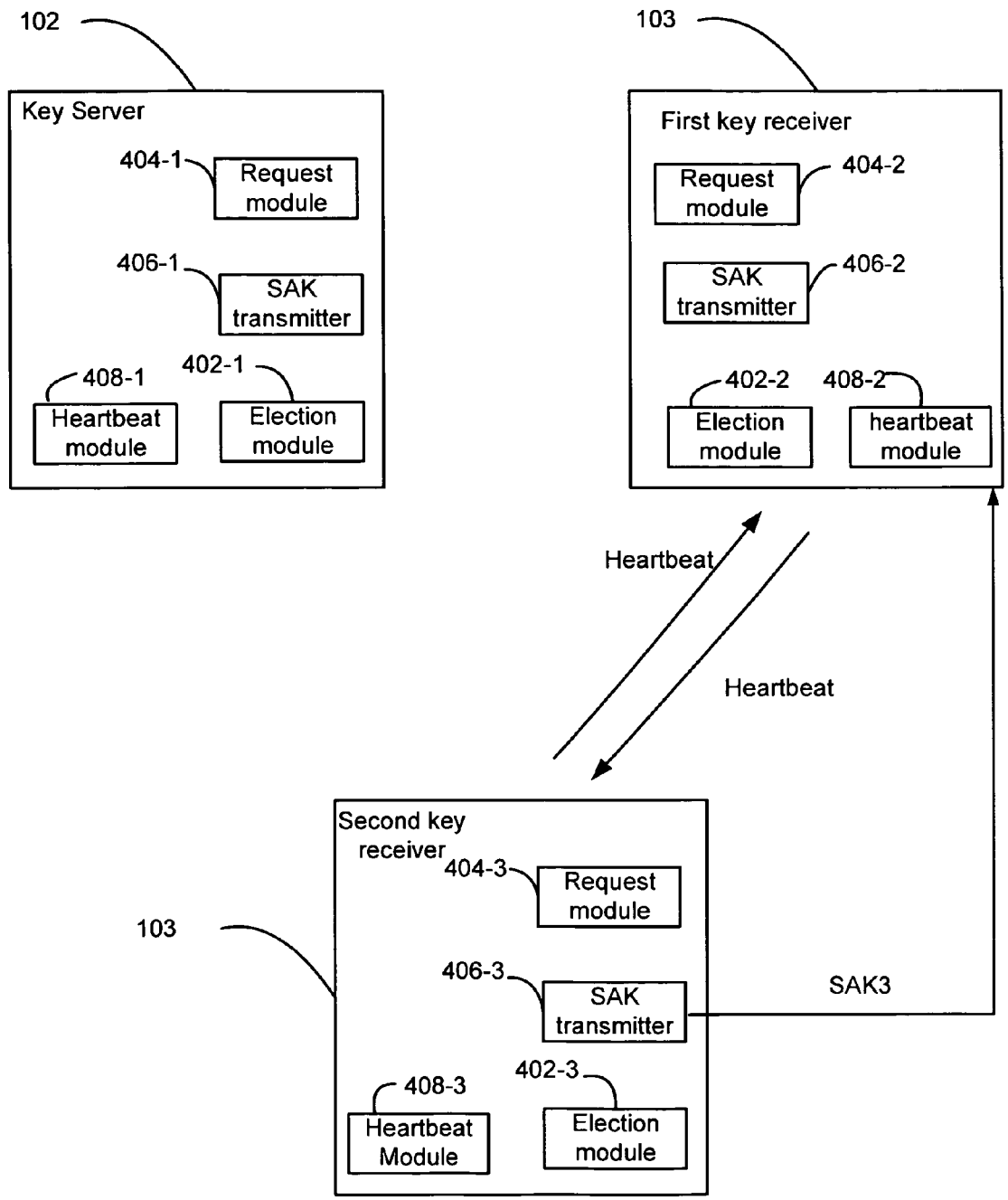

When a heartbeat message is not received from key server 102, an election process is started. FIG. 4E shows an election process between first key receiver 103 and second key receiver 103. Election module 402-2 and election module 402-3 are each configured to determine a new key server 102.

When a new key server 102 is determined, the new key server 102 uses its SAK transmitter 406 to send a new SAK, "SAK3", to the other key receiver 103. In this case, second key receiver 103 becomes key server 102 and sends SAK3 to first key receiver 103.

Accordingly, embodiments of the present invention may be used on both point-to-point links and multi-access links. As shown in FIG. 4, the same process is used whether a point-to-point link is used or a multi-access link is used. Further, the election of a new key server 102 is quickly performed after key server 102 becomes unavailable.

Other Features

Embodiments of the present invention may provide anti-replay, liveness, and denial of service protections. Anti-replay ensures that a packet is not seen more than once. This guards against attacks that replicate packets. Thus, a packet received twice is not accepted as an original packet.

Liveness protection allows a device to determine if a packet was recently sent and one that was not recently sent. The device can make this determination even if the device has never previously seen the delayed packet.

Denial of service attacks that replicate packets are stopped by the anti-replay measures provided above. The replicated packets are detected and noted as duplicated packets.

Message authentication may also be achieved using an integrity check value (ICV). The ICV may be a computed cryptographic operation over bytes of a message with a secret key, such as the CAK. The messages are then verified using a separate ICV key, which is derived from the CAK.

Although the invention has been described with respect to specific embodiments thereof, these embodiments are merely illustrative, and not restrictive of the invention. For example, although the above network segment is discussed. Other configurations may be appreciated. For example, a LAN may be a computer may be connected to a switch. The computer and switch share a key in a point-to-point relationship when communicating data over the link. Also, a LAN may be devices that are in the same IP address space. Further, a LAN may be devices may be connected logically or through switches.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for determining a new key server in a network segment, the method comprising:

receiving, at a first key receiver, a first secure key from a first key server, the first key server configured to provide the first secure key to one or more key receivers in the network segment, the first secure key used to encrypt messages sent among the group of the first key receiver and the one or more key receivers;

receiving state information from the one or more key receivers, the state information being information for a future election of the new key server;

determining, at the first key receiver, if the new key server needs to be elected;

if the new key server needs to be elected, determining the state information previously received from the one or more key receivers in the network segment; and automatically electing the new key server from a group of the first key receiver and the one or more key receivers based on the state information previously received from the one or more key receivers before the determination that the new key server needs to be elected, the election automatically performed separately at the first key receiver using a heuristic applied by the first key receiver and the one or more key receivers separately, wherein the elected new key server is configured to send a second secure key to key receivers that are not elected the new key server in the group of the first key receiver and the one or more key receivers, the second secure key used to encrypt messages sent among the group of the first key receiver and the one or more key receivers.

2. The method of claim 1, wherein the first secure key or the second secure key is used for encrypting data packets sent at a data link layer on the network segment.

3. The method of claim 1, wherein further communication with the one or more key receivers is not needed to elect the new key server.

4. The method of claim 1, further comprising:
the elected new key receiver transitioning from a key receiver state to a key server state.

5. The method of claim 1, wherein the state information is received in previously sent messages adhering to a protocol used to send the messages.

6. The method of claim 5, further comprising:
sending the second secure key to one or more key receivers in the network segment.

7. The method of claim 5, further comprising:
receiving a request from a new network device for the second secure key; and
sending the second secure key to the new network device.

8. The method of claim 1, wherein determining if the new key server needs to be elected comprises:
determining when a heartbeat message is not received from the first key server; and
performing the election step after the heartbeat message is not received.

9. The method of claim 1, wherein a second key receiver in the one or more key receivers is elected the new key server, the method further comprising:
receiving the second secure key from the second key receiver.

10. The method of claim 9, further comprising:
receiving a request for the second secure key on the network segment; and
ignoring the request.

11. The method of claim 1, wherein the one or more key receivers include a live state.

12. The method of claim 1, wherein the network segment comprises a local area network (LAN).

13. A method for managing secure keys for a first device and a second device using a first key server in a network segment, the method comprising:
receiving at the first key server, from the first device, a first request for a first secure key, the first secure key used in encrypting data communications sent in the network segment;
sending, from the first key server, a response to the first device, the response including the first secure key;
receiving at the first key server, from the second device, a second request for the first secure key; and
sending, from the first key server, a second response to the second device, the second response including the first secure key,
wherein the first device and the second device are configured to automatically elect a second key server to send a second secure key when it is determined that the first key server has become unavailable using state information previously sent between the first device and the second device, the state information being information for a future election of a new key server before a determination that the second key server needs to be elected, the election performed separately by each of the first device and the second device using a heuristic applied by the first device and the second device separately, the second secure key used in encrypting data communications sent in the network segment.

14. The method of claim 13, further comprising:
sending, from the first key server, a heartbeat message indicating that the first key server is live.

15. The method of claim 14, wherein it is determined that the second key server is needed when the heartbeat message is not received from the first key server.

16. The method of claim 13, wherein the first device stores second device state information received in messages previously sent by the second device and the second device stores first device state information previously received from the first device,
wherein the first device separately elects the second key server based on the second device state information and the second device separately elects the second key server based on the first device state information.

17. The method of claim 16, wherein the first device state information and the second device state information are received in previously sent messages adhering to a protocol used to send the messages.

18. The method of claim 13, wherein communication between the first device and the second device is not needed to elect the second key server when it is determined that the first key server has become unavailable.

19. The method of claim 13, wherein one of the first device and the second device is elected as the second key server.

20. The method of claim 13, wherein a third device is elected as the second key server.

21. A device configured to determine a new key server in a network segment the device comprising:
one or more processors; and
logic encoded in one or more tangible media for execution by the one or more processors and when executed operable to:
receive a first secure key from a first key server, the first key server configured to provide the first secure key to one or more key receivers in the network segment, the first secure key used to encrypt messages sent among the group of the device and the one or more key receivers;
receive state information from the one or more key receivers, the state information being information for a future election of the new key server;
determine if the new key server needs to be elected;
determine the state information previously received from the one or more key receivers in the network segment if the new key server needs to be elected; and
automatically elect the new key server from a group of the first key receiver and the one or more key receivers based on the state information previously received from the one or more key receivers before the determination that the new key server needs to be elected, the election automatically performed separately at the first key receiver using a heuristic applied by the first key receiver and the one or more key receivers separately,
wherein the elected key server is configured to send a second secure key to key receivers that are not elected the new key server in the group of the device and the one or more key receivers, the second secure key used to encrypt messages sent among the group of the device and the one or more key receivers.

22. The device of claim 21, wherein the first secure key or the second secure key is used for encrypting data packets sent at a data link layer on the network segment.

23. The device of claim 21, wherein further communication with the one or more key receivers is not needed to elect the new key server.

24. The device of claim 21, wherein the elected new key server comprises:
   logic operable to transition from a key receiver state to a key server state.

25. The device of claim 21, wherein the state information is received in previously sent messages adhering to a protocol used to send the messages.

26. The device of claim 25, further comprising:
   logic operable to send the second secure key to one or more key receivers in the network segment.

27. The device of claim 25, further comprising:
   logic operable to receive a request from a new network device for the second secure key; and
   logic operable to send the second secure key to the new network device.

28. The device of claim 21, wherein the logic configured to determine if the new key server needs to be elected comprises:
   logic operable to determine when a heartbeat message is not received from the first key server; and
   logic operable to perform the election step after the heartbeat message is not received.

29. The device of claim 21, wherein a second key receiver in the one or more key receivers is elected the new key server, the device further comprising:
   logic operable to receive the second secure key from the second key receiver.

30. The device of claim 29, further comprising:
   logic operable to receive a request for the second secure key on the network segment; and
   logic operable to ignore the request.

31. The device of claim 21, wherein the network segment comprises a local area network (LAN).

32. A first key server configured to manage secure keys for a first device and a second device in a network segment, the key receiver comprising:
   one or more processors; and
   logic encoded in one or more tangible media for execution by the one or more processors and when executed operable to:
   receive, from the first device, a first request for a first secure key, the first secure key used in encrypting data communications sent to devices in the network segment;
   send a response to the first device, the response including the first secure key;
   receive, from the second device, a second request for the first secure key; and
   send a second response to the second device, the second response including the first secure key,
   wherein the first device and the second device are configured to automatically elect a second key server to send a second secure key when it is determined that the first key server has become unavailable using state information previously sent between the first device and the second device, the state information being information for a future election of a new key server before a determination that the second key server needs to be elected, the election performed separately by each of the first device and the second device using a heuristic applied by the first device and the second device separately, the second secure key used in encrypting data communications sent in the network segment.

33. The first key server of claim 32, further comprising:
   logic operable to send a heartbeat message indicating that the first key server is live.

34. The first key server of claim 33, wherein the first device and second device determine that the second key server is needed when the heartbeat message is not received from the first key server.

35. The first key server of claim 32, wherein the first device stores second device state information received in messages previously sent by the second device and the second device stores first device state information previously received from the first device,
   wherein the first device separately elects the second key server based on the second device state information and the second device separately elects the second key server based on the first device state information.

36. The first key server of claim 32, wherein the first device state information and the second device state information are received in previously sent messages adhering to a protocol used to send the messages.

37. The first key server of claim 32, wherein communication between the first device and the second device is not needed to elect the second key server when it is determined that the first key server has become unavailable.

38. The first key server of claim 32, wherein one of the first device and the second device is elected as the second key server.

39. The first key server of claim 32, wherein a third device is elected as the second key server.

40. A device configured to determine a new key server in a network segment the device comprising:
   means for receiving a first secure key from a first key server, the first key server configured to provide the first secure key to one or more key receivers in the network segment, the first secure key used to encrypt messages sent among the group of the device and the one or more key receivers;
   means for receiving state information from the one or more key receivers, the state information being information for a future election of the new key server;
   means for determining if the new key server needs to be elected;
   means for determining the state information previously received from the one or more key receivers in the network segment if the new key server needs to be elected; and
   means for automatically electing the new key server from a group of the first key receiver and the one or more key receivers based on the state information previously received from the one or more key receivers before the determination that the new key server needs to be elected, the election automatically performed separately at the first key receiver using a heuristic applied by the first key receiver and the one or more key receivers separately,
   wherein the elected key server is configured to send a second secure key to key receivers that are not elected the new key server in the group of the device and the one or more key receivers, the second secure key used to encrypt messages sent among the group of the device and the one or more key receivers.

41. A first key server configured to manage secure keys for a first device and a second device in a network segment, the key receiver comprising:
   means for receiving, from the first device, a first request for a first secure key, the first secure key used in encrypting data communications sent to devices in the network segment;
   means for sending a response to the first device, the response including the first secure key;

means for receiving, from the second device, a second request for the first secure key; and means for sending a second response to the second device, the second response including the first secure key, wherein the first device and the second device are configured to automatically elect a second key server to send a second secure key when it is determined that the first key server has become unavailable using state information previously sent between the first device and the second device, the state information being information for a future election of a new key server before a determination that the second key server needs to be elected, the election performed separately by each of the first device and the second device using a heuristic applied by the first device and the second device separately, the second secure key used in encrypting data communications sent in the network segment.

* * * * *